US012430124B2

(12) United States Patent
Zmigrod et al.

(10) Patent No.: US 12,430,124 B2
(45) Date of Patent: Sep. 30, 2025

(54) SYSTEM AND METHOD FOR REDUCING CONTEXT LENGTH IN PROCESSING CODEBASE USING LARGE LANGUAGE MODEL

(71) Applicant: JPMorgan Chase Bank, N.A., New York, NY (US)

(72) Inventors: Ran Zmigrod, Cambridge (GB); Vali Tawosi, London (GB); Salwa Husam Alamir, Bournemouth (GB); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 209 days.

(21) Appl. No.: 18/370,575

(22) Filed: Sep. 20, 2023

(65) Prior Publication Data

US 2025/0094165 A1   Mar. 20, 2025

(51) Int. Cl.
  *G06F 8/70* (2018.01)
  *G06F 8/73* (2018.01)
(52) U.S. Cl.
  CPC . *G06F 8/70* (2013.01); *G06F 8/73* (2013.01)
(58) Field of Classification Search
  None
  See application file for complete search history.

(56) References Cited

U.S. PATENT DOCUMENTS

| | | | |
|---|---|---|---|
| 12,008,332 B1 * | 6/2024 | Gardner | G06F 16/345 |
| 2025/0068417 A1 * | 2/2025 | Van Der Sman | G06F 8/73 |
| 2025/0068665 A1 * | 2/2025 | Chandel | G06F 16/338 |

OTHER PUBLICATIONS

Dwight Horne, "NADER-SC: A Model Agnostic Tool for Large Scale, AI Driven Automate Source Code Summarization", IEEE, Jul. 24, 2023. (Year: 2023).*

* cited by examiner

*Primary Examiner* — Lewis A Bullock, Jr.
*Assistant Examiner* — Mark A Gooray
(74) *Attorney, Agent, or Firm* — GREENBLUM AND BERNSTEIN, P.L.C.

(57) ABSTRACT

A method and system for reducing context length in processing a codebase using large language model (LLM) are disclosed. The method includes receiving the codebase including multiple files for processing, generating, via the LLM, summaries based on the multiple files, and subsequently organizing the summaries based on a structure of the codebase. The method further includes determining a downstream task, determining whether the downstream task requires a summary of a code or the code itself, and transmitting the summary or the code to the downstream task for executing the downstream task.

14 Claims, 5 Drawing Sheets

SYSTEM AND METHOD FOR REDUCING CONTEXT LENGTH IN PROCESSING CODEBASE USING LARGE LANGUAGE MODEL

TECHNICAL FIELD

This disclosure generally relates to data processing. More specifically, the present disclosure generally relates to reducing context length in processing a codebase using a large language model (LLM), which may otherwise exhaust availability of available tokens.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

A considerable challenge exists for handling large codebases when using Large Language Models (LLMs). The challenge exists because an LLM may only process and generate finite quantity of words or tokens, which tends to be far smaller than the size of a codebase. Accordingly, even if the entire codebase may be fitted as an input to the LLM, no tokens will be left for generation. Such challenge or issue with LLMs is known as a context length problem.

One solution that has been adopted in research is to iteratively attempt the tasks in question with different parts of the codebase. Unfortunately, however, there may be dependencies or general context that this approach may miss, leading to unintended and inaccurate results.

SUMMARY

According to an aspect of the present disclosure, a method for reducing context length in processing a codebase using a large language model (LLM) is provided. The method includes receiving, the codebase via a network, for processing by the LLM, the codebase including a plurality of files; determining, by the LLM executed by a processor, a presence of one or more docstrings within at least one file among the plurality of files; when the one or more docstrings are determined to be included in the at least one file, determining whether the one or more docstrings are suitable to be used as a summary; and generating at least one first summary using the one or more docstrings; for at least one file among the plurality of files without the one or more docstrings, generating, by the LLM executed by the processor, at least one second summary; after the at least one first summary and the at least one second summary are generated, organizing, by the LLM executed by the processor, the at least one first summary and the at least one second summary based on a structure of the codebase; determining, by the processor, a downstream task to be executed; determining, by the processor, whether the downstream task requires a summary of a code or the code itself; transmitting, by the processor, the summary or the code to the downstream task; and executing, by the processor, the downstream task using the summary or the code.

According to another aspect of the present disclosure, the one or more docstrings are determined to be suitable when each of the one or more docstrings is below a reference length.

According to another aspect of the present disclosure, the one or more docstrings are determined to be suitable when each of the one or more docstrings is below a reference data size.

According to yet another aspect of the present disclosure, the one or more docstrings are determined to be suitable when each of the one or more docstrings is below a reference complexity.

According to another aspect of the present disclosure, each of the at least one first summary and the at least one second summary is below a reference length or size.

According to a further aspect of the present disclosure, a structural organization of the at least one first summary or the at least one second summary corresponds to the structure of the codebase.

According to yet another aspect of the present disclosure, the downstream task is sprint planning.

According to a further aspect of the present disclosure, the downstream task is code generation.

According to another aspect of the present disclosure, the downstream task is code testing.

According to a further aspect of the present disclosure, at least one of the at least one first summary and the at least one second summary includes a file summary.

According to a further aspect of the present disclosure, the at least one first summary and the at least one second summary includes a function summary.

According to a further aspect of the present disclosure, the structural organization of the at least one first summary or the at least one second summary organizes at least one function summary with a corresponding file summary.

According to a further aspect of the present disclosure, the structural organization of the at least one first summary and the at least one second summary includes dependencies between the at least one first summary and the at least one second summary.

According to a further aspect of the present disclosure, when the executing of the downstream task is performed using the code, the code is modified or a new code is generated.

According to a further aspect of the present disclosure, at least one third summary is generated in response to the modified code or the new code.

According to a further aspect of the present disclosure, a structure of the at least one third summary corresponds to a structure of the modified code or the new code.

According to a further aspect of the present disclosure, in the transmitting, only the summary is transmitted to the downstream task.

According to a further aspect of the present disclosure, the summary generates a smaller context length than the codebase when processed by the LLM.

According to an aspect of the present disclosure, a system for reducing context length in processing a codebase using an LLM is provided. The system includes a memory, a display and a processor. The system is configured to perform: receiving, the codebase via a network, for processing by the LLM, the codebase including a plurality of files; determining, by the LLM executed by the processor, a presence of one or more docstrings within at least one file among the plurality of files; when the one or more docstrings are determined to be included in the at least one file, determining whether the one or more docstrings are suitable to be used as a summary; and generating at least one first summary using the one or more docstrings; for at least one file among the plurality of files without the one or more docstrings, generating, by the LLM executed by the processor, at least one second summary; after the at least one first summary and the at least one second summary are generated, organizing, by the LLM executed by the processor, the at least one first summary and the at least one second summary based on a structure of the codebase; determining a downstream task to be executed; determining whether the downstream task requires a summary of a code or the code itself; transmitting the summary or the code to the downstream task; and executing the downstream task using the summary or the code.

According to another aspect of the present disclosure, a non-transitory computer readable storage medium that stores a computer program for reducing context length in processing a codebase using an LLM is provided. The computer program, when executed by a processor, causes a system to perform multiple processes including: receiving, the codebase via a network, for processing by the LLM, the codebase including a plurality of files; determining, by the LLM executed by the processor, a presence of one or more docstrings within at least one file among the plurality of files; when the one or more docstrings are determined to be included in the at least one file, determining whether the one or more docstrings are suitable to be used as a summary; and generating at least one first summary using the one or more docstrings; for at least one file among the plurality of files without the one or more docstrings, generating, by the LLM executed by the processor, at least one second summary; after the at least one first summary and the at least one second summary are generated, organizing, by the LLM executed by the processor, the at least one first summary and the at least one second summary based on a structure of the codebase; determining a downstream task to be executed; determining whether the downstream task requires a summary of a code or the code itself; transmitting the summary or the code to the downstream task; and executing the downstream task using the summary or the code.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
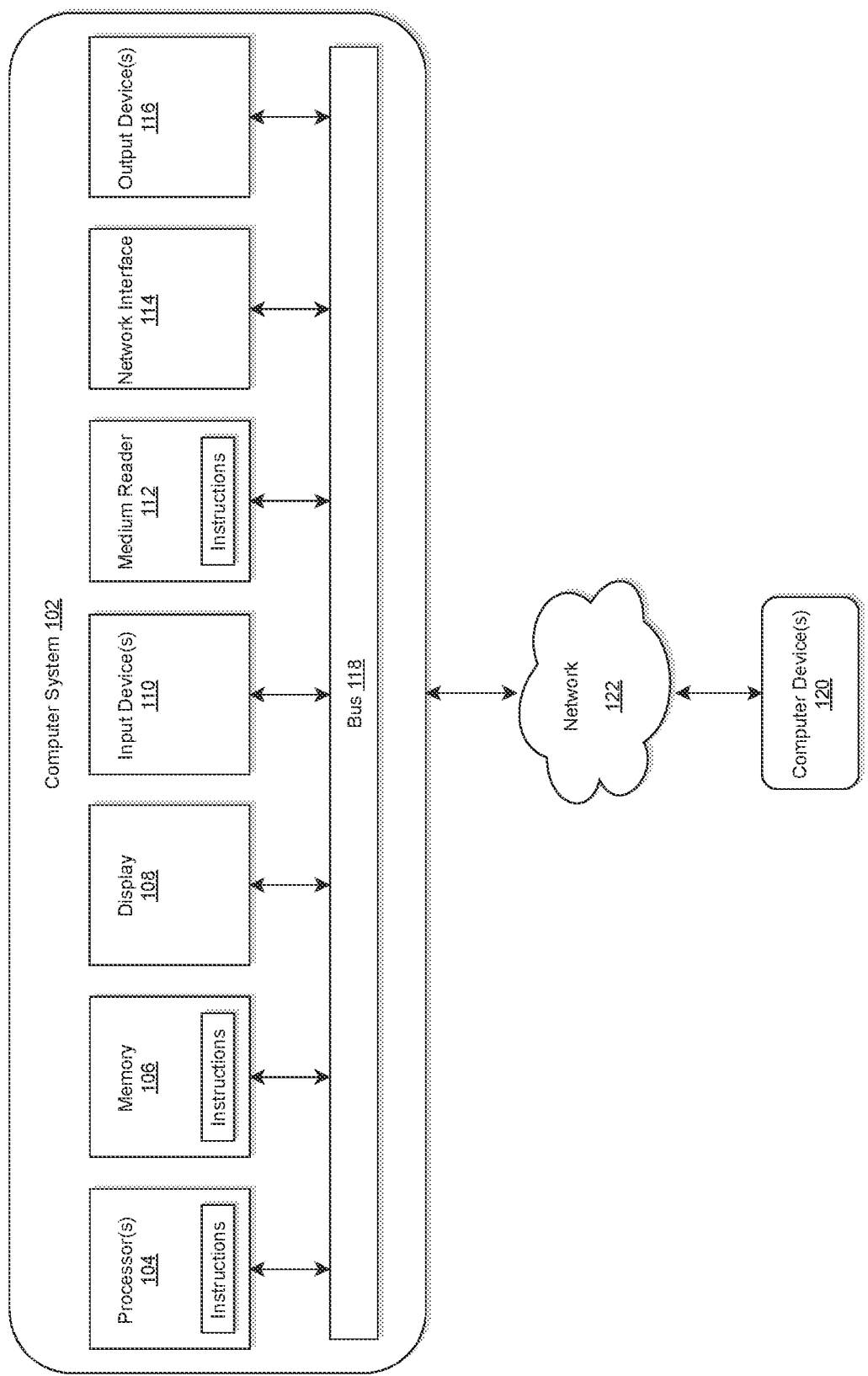
FIG. 1 illustrates a computer system for implementing a context length reduction (CLR) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a context length reduction (CLR) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
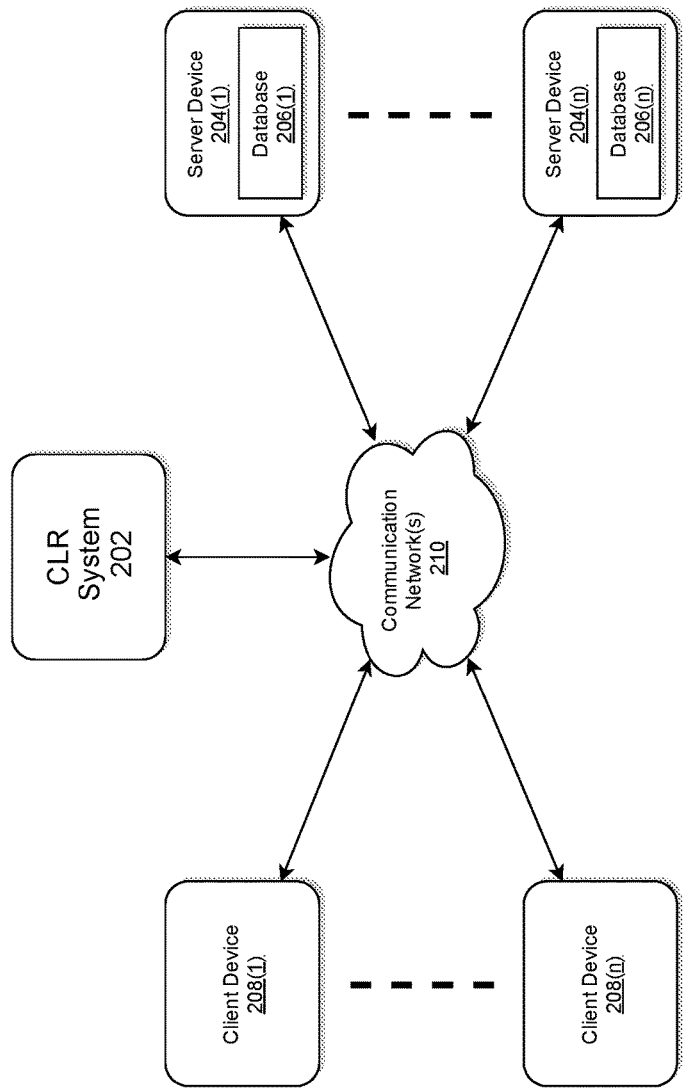
FIG. 2 illustrates an exemplary diagram of a network environment with a CLR system in accordance with an exemplary embodiment.

FIG. 2 illustrates an exemplary diagram of a network environment with a CLR system in accordance with an exemplary embodiment.

A CLR system 202 may be implemented with one or more computer systems similar to the computer system 102 as described with respect to FIG. 1.

The CLR system 202 may store one or more applications that can include executable instructions that, when executed by the CLR system 202, cause the CLR system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the CLR system 202 itself, may be located in virtual server(s) running in a cloud-based computing environment rather than being tied to one or more specific physical network computing devices. Also, the application(s) may be running in one or more virtual machines (VMs) executing on the CLR system 202. Additionally, in one or more embodiments of this technology, virtual machine(s) running on the CLR system 202 may be managed or supervised by a hypervisor.

In the network environment 200 of FIG. 2, the CLR system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the CLR system 202, such as the network interface 114 of the computer system 102 of FIG. 1, operatively couples and communicates between the CLR system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CLR system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CLR system 202 may be a standalone device or integrated with one or more other devices or apparatuses, such as one or more of the server devices 204(1)-204(n), for example. In one particular example, the CLR system 202 may be hosted by one of the server devices 204(1)-204(n), and other arrangements are also possible. Moreover, one or more of the devices of the CLR system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CLR system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CLR system 202 that may efficiently provide a platform for implementing a cloud native CLR system module, but the disclosure is not limited thereto.

The client devices 208(1)-208(n) may run interface applications, such as standard web browsers or standalone client applications, which may provide an interface to communicate with the CLR system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CLR system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CLR system 202, the server devices 204(1)-204(n), or the client devices 208(1)-208(n), for example, may be configured to operate as virtual instances on the same physical machine. For example, one or more of the CLR system 202, the server devices 204(1)-204(n), or the client devices 208(1)-208(n) may operate on the same physical device rather than as separate devices communicating through communication network(s) 210. Additionally, there may be more or fewer CLR system 202, server devices 204(1)-204(n), or client devices 208(1)-208(n) than illustrated in FIG. 2. According to exemplary embodiments, the CLR system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
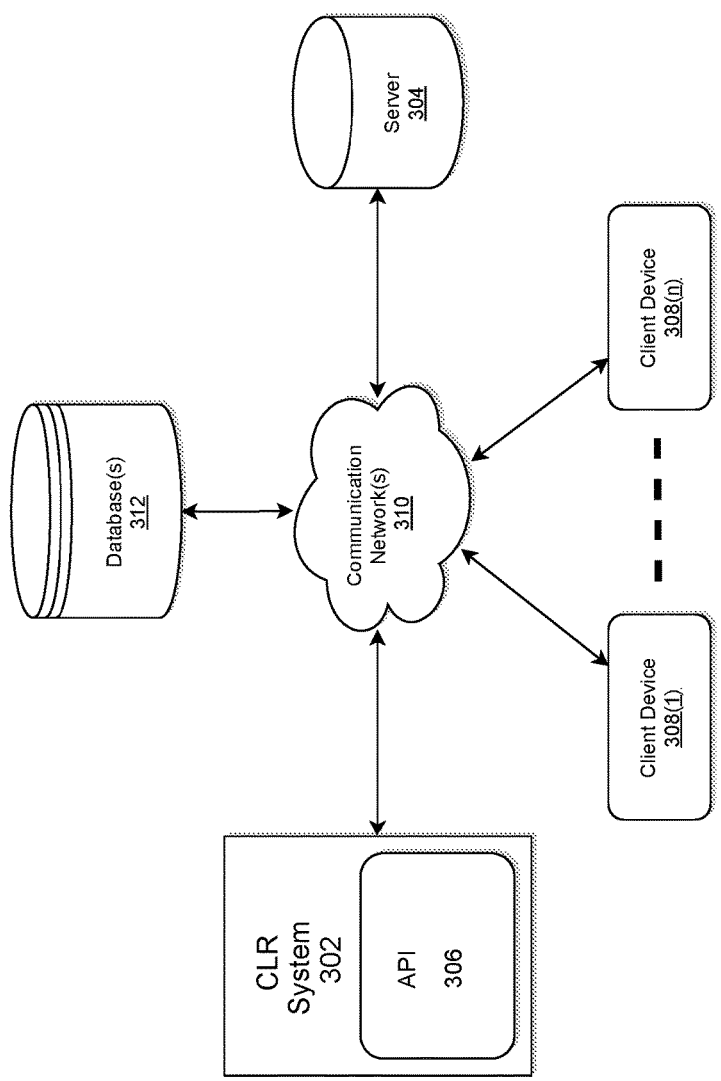
FIG. 3 illustrates a system diagram for implementing a CLR system in accordance with an exemplary embodiment.

FIG. 3 illustrates a system diagram for implementing a CLR system in accordance with an exemplary embodiment.

As illustrated in FIG. 3, the system 300 may include a CLR system 302 within which a group of API modules 306 is embedded, a server 304, a database(s) 312, a plurality of client devices 308(1) . . . 308(n), and a communication network 310.

According to exemplary embodiments, the CLR system 302 including the API modules 306 may be connected to the server 304, and the database(s) 312 via the communication network 310. Although there is only one database that has been illustrated, the disclosure is not limited thereto. Any number of databases may be utilized. The CLR system 302 may also be connected to the plurality of client devices 308(1) . . . 308(n) via the communication network 310, but the disclosure is not limited thereto.

According to exemplary embodiment, the CLR system 302 is described and shown in FIG. 3 as including the API modules 306, although it may include other rules, policies, modules, databases, or applications, for example. According to exemplary embodiments, the database(s) 312 may be embedded within the CLR system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable CLR system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the CLR system 302. In this regard, the plurality of client devices 308(1) . . . 308(n) may be "clients" of the CLR system 302 and are described herein as such. Nevertheless, it is to be known and understood that the plurality of client devices 308(1) . . . 308(n) need not necessarily be "clients" of the CLR system 302, or any entity described in association therewith herein. Any additional or alternative relationship may exist between either or both of the plurality of client devices 308(1) . . . 308(n) and the CLR system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CLR system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CLR system 302 may be the same or similar to the CLR system 202 as described with respect to FIG. 2, including any features or combination of features described with respect thereto.

Figure 4:
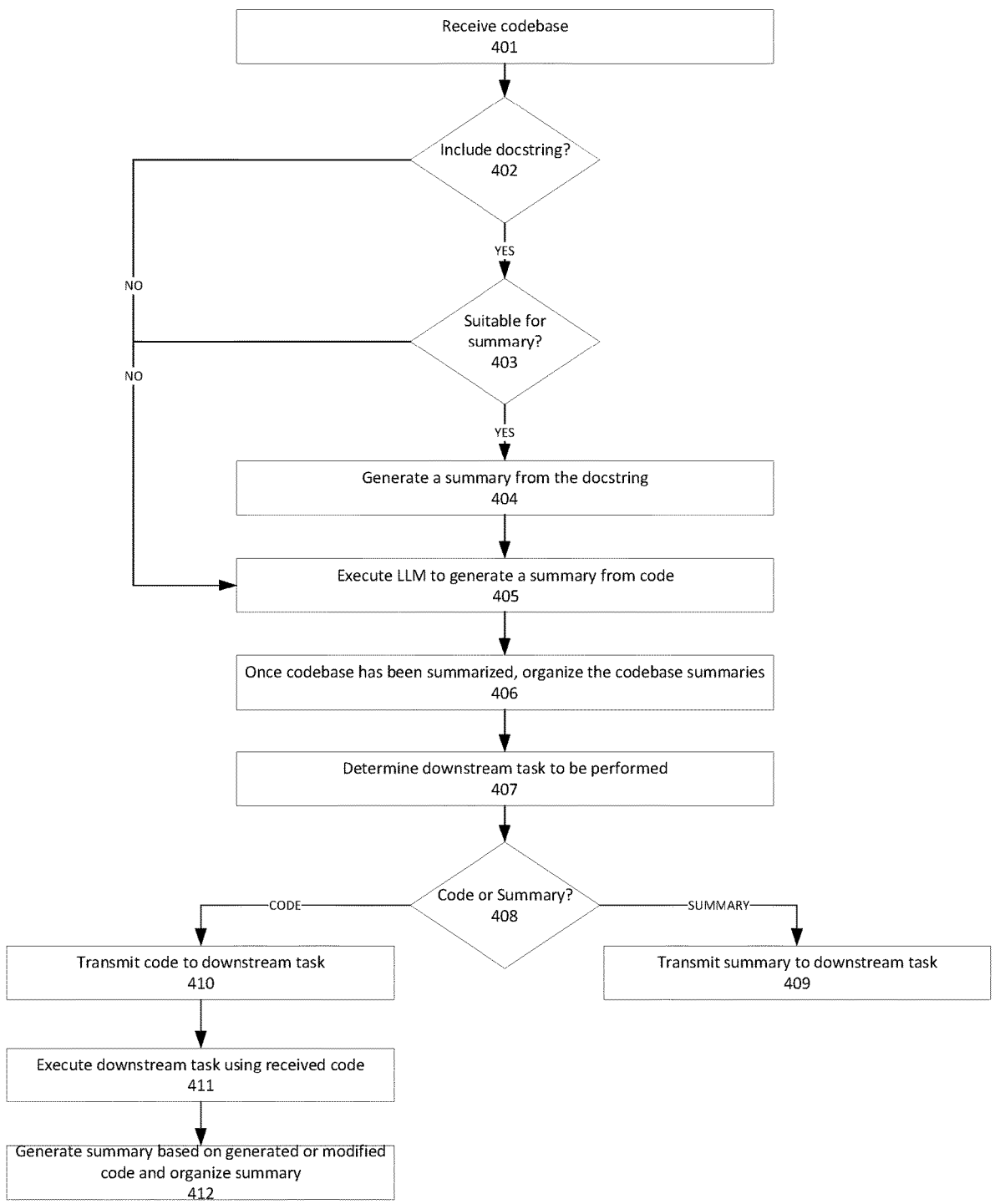
FIG. 4 illustrates a method for reducing context length in processing a codebase via a large language model (LLM) in accordance with an exemplary embodiment.

FIG. 4 illustrates a method for reducing context length in processing a codebase via an LLM in accordance with an exemplary embodiment.

In operation 401, a codebase may be received for data processing from one or more database via a network. According to exemplary aspects, a codebase may refer to a body of source code for a software program, component or system. The codebase may include multiple source files needed to compile the software into machine code. Some of the source files may include comments or descriptions of functions included in a respective source file, which may be helpful to a developer that may later access the source file for troubleshooting or modifications. In an example, the comments or descriptions may be included as docstrings.

In operation 402, each of the files included in the codebase may be scanned to check whether or not the files include one or more docstrings. For example, the docstrings may refer to comments or notes provided by a developer for a respective file. The comments or notes may be specific to the respective file or specific to one or more functions included in the respective file. If a respective file is determined to include one or more docstrings, the method proceeds to operation 403 for further checks. Alternatively, if the respective file is determined to be void of any docstrings, the method proceeds to operation 405.

In operation 403, each of the identified docstrings may be checked to determine whether or not the identified docstrings are suitable for summarization. For example, if a comment or note is below a reference length or size, the respective comment may be determined to be suitable for summarization and the method proceeds to operation 404. On the other hand, if the comment or note is above the reference length or size, it may be determined that the respective comment or note is not suitable for summarization and the method proceeds to operation 405. However, aspects of the present disclosure are not limited thereto, such that the comment or note above the reference length may be processed to be condensed for summarization. Alternatively, the comment or note above the reference length be divided into multiple parts for iterative generation of multiple summaries.

In operation 404, for the docstrings determined to be suitable for usage as a summary may be extracted and generated as a summary. In an example, the respective docstrings may be extracted and provided as a summary without modification. However, aspects of the present disclosure are not limited thereto, such that some amount of data processing (e.g., removing of extraneous information, separating the docstring into multiple parts for separate summaries, and etc.) may be performed prior to providing the docstring as a summary.

In operation 405, after generating one or more summaries from docstrings in operation 404, remaining summaries may be generated using underlying code of the codebase. Accordingly, at the end of operation 405, summaries from docstrings and code may be available for further processing or manipulation. More specifically, for source files of the codebase or functions within the source files of the codebase not having corresponding docstrings, a corresponding summary may be generated from the code included in the respective source files. According to exemplary aspects, the LLM may be executed to automatically segment the codebase into multiple parts or files, and each of the files may be summarized independently. However, if one of the source files included in the codebase is determined to be above a certain threshold, the respective file may be broken into multiple subfiles, for independent summarization. Moreover, a summary of a source file may include summaries of functions included in the source file.

According to exemplary aspects, the LLM may have a bespoke prompt for generating summaries for each granularity (e.g., file level, function level and the like). In an example, summarization of a file may include, without limitation, extracting of key terms, identifying and removing extraneous information, and insertion of additional language to provide a clear and concise summary based on context information.

In operation 406, once the divided parts of the codebase have been independently summarized using both docstrings and code, the generated summaries are organized to reflect the organizational code structure provided in the original codebase. For example, function summaries may be structured to be under a certain file, functional or file dependencies may be retained, retain a certain sequence of execution and the like. Accordingly, by organizing the generated summaries to reflect the original codebase, a user may be able to determine how each function or file may interact with other parts of the codebase based on the organization of the summaries.

In operation 407, a downstream task to be performed is determined, identified or selected. According to exemplary aspects, each of the downstream tasks to be performed may be provided or determined by a processor or a machine learning model. In an example, downstream tasks may include, without limitation, sprint planning, code generation, and code testing.

In operation 408, for each of the downstream tasks to be performed, a determination of whether a summary or underlying code is to be provided to a respective downstream task is determined. Based on the nature of the downstream task to be performed, either a summary or underlying code is transmitted to the downstream task. In an example, sprint planning downstream task may aim to generate a group of sub-tasks that must be accomplished as part of a software engineering sprint, and may require only a summary as opposed to the full underlying code. On the other hand, the code generation downstream task may be directed to generating or modification of code, which may require a code to be provided as a summary would not serve much purpose for the respective downstream task. At least since, summaries that are smaller in size is provided in certain downstream tasks instead of providing the underlying code for every downstream task, overall context length provided to the LLM may be reduced to improve performance of the LLM.

In operation 409, if the downstream task to be performed only requires a summary, a corresponding summary or summaries are provided to the downstream task for execution. At least since the summary may be smaller in data size in comparison to the underlying code, context length may be reduced, and less memory and CPU processing may be utilized in executing the respective downstream task.

In operation 410, if the downstream task to be performed requires underlying code instead of a summary, then the underlying code is transmitted to the downstream task for execution. In operation 411, the respective downstream task is executed using the received code for generating new code or modifying the received code. In operation 412, one or more summaries may be generated based on the code generated or modified in response to the executed downstream task.

In operation 412, at least since the generated or modified code alters the originally generated summaries, one or more summaries may be generated based on the newly generated or modified code, and the organization of the summaries may be updated based on the newly generated one or more summaries. Accordingly, the codebase summary may be updated along with the underlying codebase to correspond to the codebase at any given time.

Figure 5:
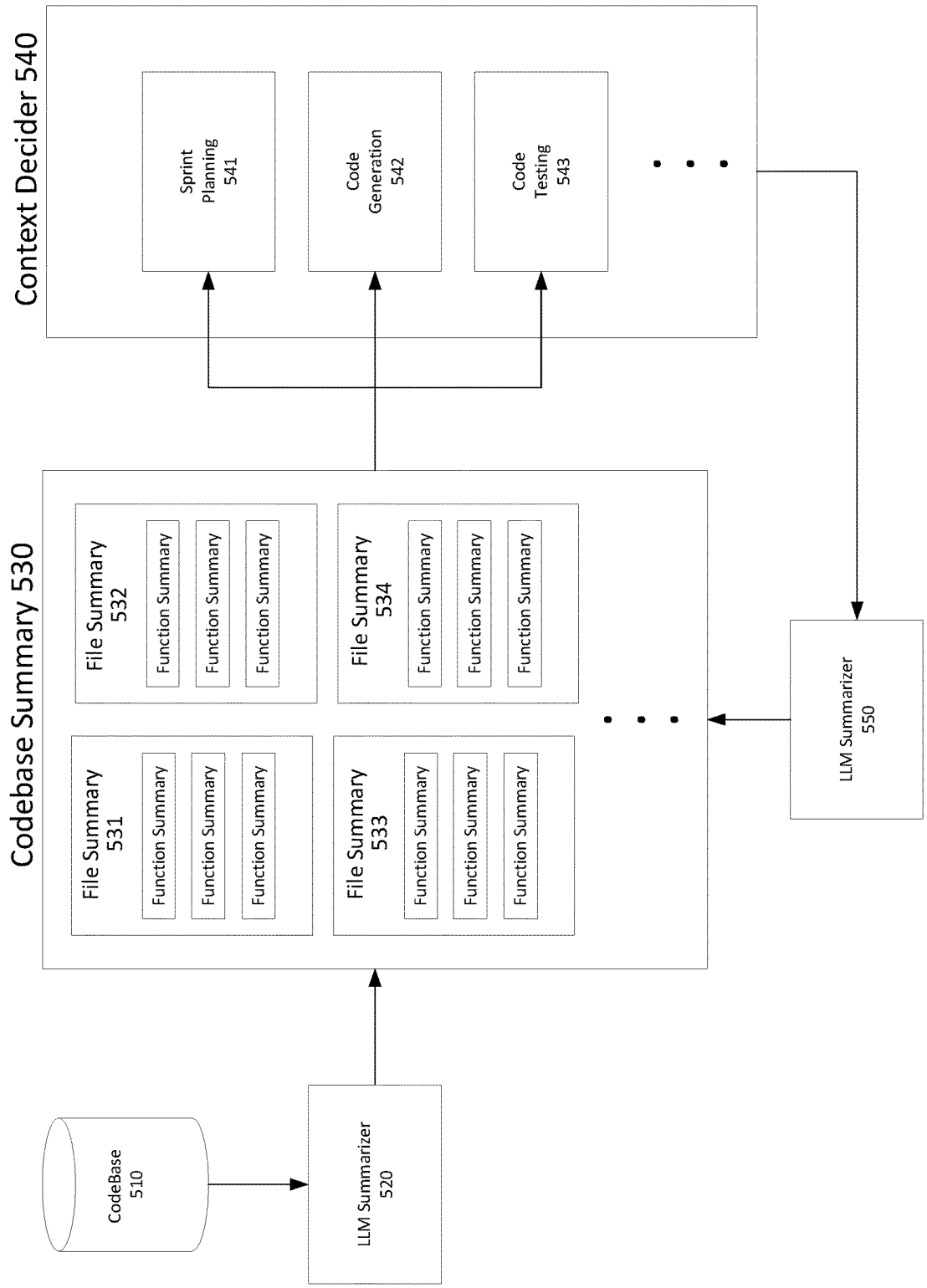
FIG. 5 illustrates a system flow for reducing context length in processing a codebase via an LLM in accordance with an exemplary embodiment.

FIG. 5 illustrates a system flow for reducing context length in processing a codebase via an LLM in accordance with an exemplary embodiment.

According to exemplary aspects, a large language model or LLM may refer to a deep learning algorithm that is able to recognize, summarize, translate, predict and generate text and other forms of content based on knowledge gained from large datasets. While small language models may serve as foundation for understanding language structure and basic tasks, an LLM may offer more complex, contextualized and nuanced language processing capabilities.

According to exemplary aspects, a codebase 510 may refer to a body of source code for a software program, component or system. The codebase may include multiple source files needed to compile the software into a machine code, and may be very large in size. Some of the source files may include comments or descriptions of functions included in a respective source file, which may be helpful to a developer that may later access the source file for troubleshooting or modifications. In an example, the comments or descriptions may be included as docstrings.

Due to the size of the codebase 510, the LLM summarizer 520 may generate summaries for the codebase at different granularities, such as at file level or function level. According to exemplary aspects, the LLM summarizer 520 may generate one or more summaries for the codebase 510 using docstrings included in the codebase 510 or the underlying code itself. The LLM summarizer 520 may use docstrings for certain files or functions, while using underlying code for the remaining files and/or functions within the codebase 510.

For example, the docstrings may refer to comments or notes provided by a developer for a respective file. The comments or notes may be specific to the respective file or specific to one or more functions included in the respective file. Dependent on how well the codebase is maintained and/or documented, at least some of the docstrings included in the codebase may be leveraged to extract some summaries.

However, docstrings may not exist for all parts of the codebase and for all granularities. For example, docstrings may be present for only some of the files or certain functions within the files. Further, some docstrings may be too technical or verbose to be properly utilized for being provided as a summary. In such cases, the docstrings may be discarded or modified, if the respective docstrings are salvageable. For example, in such docstrings, some of the overly technical aspects may be removed for salvaging the respective docstrings. For an overly lengthy docstring, the respective docstring may be divided into multiple parts in iterative manner for generating multiple summaries.

Moreover, when a file included in the codebase 510 does not include a corresponding docstring or docstrings are missing for one or more functions within the respective file, then the LLM summarizer 520 may generate a summary from an underlying code included in the file. According to exemplary aspects, the LLM summarizer 520 may be utilized to generate a bespoke prompt for generating summaries for each granularity. In an example, summarization of a file may include, without limitation, extracting of key terms, identifying and removing extraneous information, and insertion of additional language to provide a clear and concise summary based on context information.

According to aspects, the LLM summarizer 520 may summarize a codebase one file at a time. However, aspects of the present disclosure are not limited thereto, such that if the files are sufficiently small, multiple files may be processed at a time to improve efficiency. On the other hand, if the files are too big themselves for the LLM context, a file may be iterated through for summarization as much as possible within the context length. To summarize the remainder of the file, the LLM summarizer 520 is iteratively utilized to summarize further components of the file while including the summaries that have already been made for the respective file. According to aspects, the initial summarization process may not avoid the iterative process it attempts to solve, but may not get as heavily affected as summarization should be fairly modular.

According to exemplary aspects, the codebase summary 530 may be outputted by the LLM summarizer 520. Once the entirety of the codebase 510 has been summarized by the LLM summarizer 520, a structured object may be utilized to organize the generated summaries. More specifically, the generated summaries may be organized to reflect the organizational code structure provided in the original codebase. For example, function summaries may be structured to be under a certain file, functional or file dependencies may be retained, retain a certain sequence of execution and the like. Accordingly, by organizing the generated summaries to reflect the original codebase, a user may be able to determine how each function or file may interact with other parts of the codebase based on the organization of the summaries.

According to exemplary aspects, the codebase summary 530 may be a hierarchical structure, such that it may be easy to traverse, output specific summaries, and choose granularities for the summaries. Further, such a structured object for the codebase summary 530 may also enable modification of the structure and summaries of different components of the codebase. As illustrated in FIG. 5, the codebase summary 530 may be organized in a plurality of file summaries, such as file summary 531, file summary 532, file summary 533 and file summary 534. Although four file summaries are illustrated, aspects of the present disclosure are not limited thereto, such that the codebase summary 530 may include less or more file summaries. Each of the file summaries may include one or more function summaries.

According to exemplary aspects, depending on the task at hand, summaries may be required for only select portion of the codebase and not the entire codebase. Similarly, if the actual code is required to be modified (e.g., for code generation), the actual code may need to be known rather than a summary for some functions or file. A determination in this regard may be dependent on a downstream task. Accordingly, a general module may be incorporated, from which each downstream task may be executed. For example, for sprint planning, only code summaries may be required. However, for code generation, access to complete code may be necessary rather than a summary.

According to exemplary aspects, the content decider 540 may determine or select a downstream task to be performed. Further, the content decider 540 may be built on a general module for each of the downstream tasks, and feed in the shortened context or summary into the respective downstream task. For the downstream task determined or selected, the content decider 540 may determine whether the code itself or a summary is required for the respective downstream task. Based on the input required for the downstream task (e.g., underlying code or summary), the content decider 540 may obtain either the summary from the codebase summary 530 or the underlying code from the codebase 510, and provide either the underlying code or the summary to the respective downstream task. At least since summaries that are smaller in size is provided in certain downstream tasks instead of providing the underlying code for every downstream task, overall context length provided to the LLM may be reduced to improve performance of the LLM.

According to exemplary aspects, downstream tasks to which the content decider 540 may transmit the underlying code or summary include, without limitation, spring planning 541, code generation 542, and code testing 543. However, aspects of the present disclosure are not limited thereto, such that the downstream tasks may include additional downstream tasks or different set of downstream tasks.

According to exemplary aspects, a purpose of code summarization may be to pass the code summaries to other code-based tasks for which the LLM may typically be applied. In an example, the sprint planning 541 may aim to generate sub-tasks that must be accomplished as part of a software engineering sprint or a set duration. The code generation 542 may be directed to generating or modification of code, and code test 543 may be directed to testing of the generated or modified code. In an example, sprint planning 541 downstream task may require only a summary as opposed to the full underlying code as it's directed to planning of tasks to be completed within a set duration. On the other hand, the code generation 542 downstream task may require the underlying code as the code generation 542 may be directed to modifying the underlying code or adding onto the underlying code. Accordingly, for the code generation 542, a summary would not serve much purpose for the respective downstream task.

Further to the above, some downstream tasks (e.g., code generation 542) may result in new or modified code being written into the codebase. In such cases, the new or modified code may be summarized by the LLM summarizer 550. In addition, other code content in a file that may have been modified with the new or modified code may be resummarized by the LLM summarizer 550. According to exemplary aspects, the LLM summarizer 550 may operate similarly to the LLM summarizer 520, but may be configured to obtain input code for summarization from different sources.

Further to the above, once the summaries are generated, an auditor may intermittently or in response to an event (e.g., generation or modification of code) may examine the generated summaries for conciseness and clarity. In an example, such examination may be carried out using one or more machine learning or artificial intelligence algorithms or models.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for reducing context length in processing a codebase using a large language model (LLM), the method comprising:
   receiving, the codebase via a network, for processing by the LLM, the codebase including a plurality of files;
   determining, by the LLM executed by a processor, a presence of one or more docstrings within at least one file among the plurality of files;
   for the at least one file having the one or more docstrings, performing the steps of:
      determining whether the one or more docstrings are suitable to be used as a summary, wherein the one or more docstrings are determined to be suitable when each of the one or more docstrings is below a reference length or data size; and
      generating at least one first summary using the one or more suitable docstrings;
   for at least one file among the plurality of files without the one or more docstrings, generating, by the LLM executed by the processor, at least one second summary;
   after the at least one first summary and the at least one second summary are generated, organizing, by the LLM executed by the processor, the at least one first summary and the at least one second summary based on a structure of the codebase;
   while generating the at least one first summary and the at least one second summary, determining, by the processor, a downstream task to be executed;
   determining, by the processor, that the downstream task only requires a subset of the organized summaries based on the nature of the downstream task;
   transmitting, by the processor, only the determined subset of organized summaries to the downstream task; and
   executing, by the processor, the downstream task using the subset of organized summaries.

2. The method according to claim 1, wherein each of the at least one first summary and the at least one second summary is below a reference length or size.

3. The method according to claim 1, wherein a structural organization of the at least one first summary or the at least one second summary corresponds to the structure of the codebase.

4. The method according to claim 3, wherein the structural organization of the at least one first summary and the at least one second summary includes dependencies between the at least one first summary and the at least one second summary.

5. The method according to claim 3, wherein the structural organization of the at least one first summary or the at least one second summary organizes at least one function summary with a corresponding file summary.

6. The method according to claim 1, wherein the downstream task is sprint planning.

7. The method according to claim 1, wherein the downstream task is code generation.

8. The method according to claim 1, wherein the downstream task is code testing.

9. The method according to claim 1, wherein at least one of the at least one first summary and the at least one second summary includes a file summary.

10. The method according to claim 1, wherein the at least one first summary and the at least one second summary includes a function summary.

11. The method according to claim 1, wherein, in the transmitting, only the summary is transmitted to the downstream task.

12. The method according to claim 1, wherein the summary generates a smaller context length than the codebase when processed by the LLM.

13. A system for reducing context length in processing a codebase using a large language model (LLM), the system comprising:
a memory; and
a processor, wherein the system is configured to perform:
receiving, the codebase via a network, for processing by the LLM, the codebase including a plurality of files;
determining, by the LLM executed by the processor, a presence of one or more docstrings within at least one file among the plurality of files;
for the at least one file having the one or more docstrings, performing the steps of:
determining whether the one or more docstrings are suitable to be used as a summary, wherein the one or more docstrings are determined to be suitable when each of the one or more docstrings is below a reference length or data size; and
generating at least one first summary using the one or more suitable docstrings;
for at least one file among the plurality of files without the one or more docstrings, generating, by the LLM executed by the processor, at least one second summary;
after the at least one first summary and the at least one second summary are generated, organizing, by the LLM executed by the processor, the at least one first summary and the at least one second summary based on a structure of the codebase;
while generating the at least one first summary and the at least one second summary, determining a downstream task to be executed;
determining that the downstream task only requires a subset of the organized summary of a code based on the nature of the downstream task;
transmitting only the determine subset of organized summaries to the downstream task; and
executing the downstream task using the subset of organized summaries.

14. A non-transitory computer readable storage medium that stores a computer program for reducing context length in processing a codebase using a large language model (LLM), the computer program, when executed by a processor, causing a system to perform a plurality of processes comprising:
receiving, the codebase via a network, for processing by the LLM, the codebase including a plurality of files;
determining, by the LLM executed by the processor, a presence of one or more docstrings within at least one file among the plurality of files;
for the at least having the one or more docstrings, performing the steps of:
determining whether the one or more docstrings are suitable to be used as a summary, wherein the one or more docstrings are determined to be suitable when each of the one or more docstrings is below a reference length or data size; and
generating at least one first summary using the one or more suitable docstrings;
for at least one file among the plurality of files without the one or more docstrings, generating, by the LLM executed by the processor, at least one second summary;
after the at least one first summary and the at least one second summary are generated, organizing, by the LLM executed by the processor, the at least one first summary and the at least one second summary based on a structure of the codebase;
while generating the at least on first summary and the at least one second summary determining a downstream task to be executed;
determining that the downstream task only requires a subset of the organized summaries based on the nature of the downstream task;
transmitting only the determined subset of organized summaries to the downstream task; and
executing the downstream task using the subset of organized summaries.

\* \* \* \* \*